United States Patent [19]

Hing

[11] Patent Number: 4,694,219
[45] Date of Patent: * Sep. 15, 1987

[54] DISCHARGE LAMP ARC TUBES

[75] Inventor: Peter Hing, Birstall, England

[73] Assignee: Thorn EMI plc, London, England

[*] Notice: The portion of the term of this patent subsequent to Apr. 29, 2003 has been disclaimed.

[21] Appl. No.: 817,057

[22] Filed: Jan. 8, 1986

Related U.S. Application Data

[63] Continuation of Ser. No. 690,408, Jan. 10, 1985, Pat. No. 4,585,972, which is a continuation of Ser. No. 332,216, Dec. 18, 1981, abandoned.

[30] Foreign Application Priority Data

Dec. 20, 1980 [GB] United Kingdom ............... 8040906

[51] Int. Cl.$^4$ ................. H01J 61/22; H01J 61/30; H01J 61/36; C03C 8/24
[52] U.S. Cl. ............................. 313/636; 313/624; 313/638; 501/15; 501/17; 501/63; 501/64; 501/66; 501/67; 501/69
[58] Field of Search ............... 313/636, 642, 624, 638; 156/89; 501/15, 17, 66, 63, 64, 67, 69; 65/43

[56] References Cited

U.S. PATENT DOCUMENTS

| | | | |
|---|---|---|---|
| 3,489,627 | 1/1970 | Botden et al. | 156/89 |
| 3,496,401 | 2/1970 | Dumbaugh | 501/66 |
| 3,804,608 | 4/1974 | Gaskell et al. | 501/63 |
| 4,135,110 | 1/1979 | Chalmers et al. | 313/642 |
| 4,155,758 | 5/1979 | Evans et al. | 313/636 |
| 4,316,936 | 2/1982 | Hing | 156/89 X |
| 4,501,799 | 2/1985 | Driessen et al. | 313/636 |
| 4,539,511 | 9/1985 | Denbigh et al. | 313/624 |

OTHER PUBLICATIONS

Rankin, G. A., et al., "The Ternary System MgO—Al$_2$O$_3$—SiO$_2$", Am. J. of Science, vol. LXV, Apr. 1918, pp. 301-325.

Primary Examiner—Mark L. Bell
Attorney, Agent, or Firm—Fleit, Jacobson, Cohn & Price

[57] ABSTRACT

An arc discharge lamp is provided using sealing compositions comprising mainly Al$_2$O$_3$—SiO$_2$—MgO. Preferred compositions include between 25 to 28% by weight of MgO and 13 to 21% by weight of Al$_2$O$_3$ since these have lower melting points than others in the group. The sealing compositions are used to seal end closure members of alumina or cermet to ceramic arc tubes for use in discharge lamps. The compositions are selected to have linear expansion co-efficients compatible with the materials of the end closures and arc tubes. The methods described give sealing times of between 3 and 4 minutes.

4 Claims, 2 Drawing Figures

DISCHARGE LAMP ARC TUBES

This is a continuation of application Ser. No. 690,408 filed Jan. 10, 1985, now U.S. Pat. No. 4,585,972, which is a continuation of application Ser. No. 332,216, filed Dec. 18, 1981 (abandoned).

This invention relates to discharge lamp arc tubes and in particular to such tubes which comprise envelopes of polycrystalline alumina, sapphire or a spinel and one or more end closures. These end closures are preferably of cermet, but may be of any other suitable material such as alumina or niobium. Such tubes are useful in the construction of discharge lamps containing metal or metal vapours, such as sodium or tin, or a wide range of metal halide vapours such as sodium chloride, sodium bromide, aluminium chloride, tin chloride, scandium iodide, rare earth halides, mercuric chlorides and iodides and the like. The envelopes mentioned above are well known in the art and cermet end closures therefor are described and claimed in our British specification No. 1571084. These cermet end closures are of value because they can be produced from materials which result in a product having a co-efficient of linear expansion which is intermediate between the materials comprising on the one hand, the arc tube envelope and on the other hand, the generally metallic electrode. A wide range of cermet materials can be produced, depending on the particular co-efficient of linear expansion which is required. Particularly preferred types of cermet are those comprising alumina and tungsten or alumina and molybdenum. These may suitably contain a volume fraction of metal of from 0.045 to 0.2 where volume fraction is defined as the ratio of the volume of the metal to the total volume of the ceramic and metal and will normally have a co-efficient of linear expansion from 50 to $85.10^{-7}$ per °C. over a range of 100° to 1000° C.

In our Canadian Pat. No. 1110280 we disclose and claim sealing compositions which may be used for sealing such cermet end closures to ceramic envelopes. These compositions comprise at least 70% by weight of refractory oxide (preferably $Al_2O_3$) and minor quantities of non-vitreous additives comprising $SiO_2$, MgO and $B_2O_3$. In use, the sealing composition is applied to the end closure and envelope and the resultant assembly held at an elevated temperature until the seal is made. In practice, the compositions of Canadian Pat. No. 1110280 require between 30 and 60 minutes to achieve the seal. We have now found that sealing compositions can be obtained using an $Al_2O_3$—$SiO_2$—MgO system wherein the quantities of $SiO_2$ and MgO are increased over the quantities of these materials according to Canadian Pat. No. 1110280. In use the sealing compositions of the present invention offer the very important advantage that the total time for making a completed seal is reduced to something of the order of ten minutes or less. A problem experienced in discharge lamp production is loss of fill at assembly and particularly during the sealing of the arc tube. Normally one end of the arc tube is sealed first, the fill inserted and then the second end sealed. It is advantageous if the temperatures and pressures used to seal the second end of the arc tube are such as to minimise this volatilisation and hence loss of gas fill. In addition to this the materials from which the arc tube envelope is made, for example, polycrystalline alumina, sapphire or a spinel are all extremely difficult materials to work, that is, to form into the various shapes applicable for arc tubes. For example, one well known method of obtaining arc tubes of the correct length is to saw through the tube with a diamond wheel which results in a very rough surface even to the extent of providing ridges easily felt by hand and this adds to the difficulties of making good seals.

In order to alleviate this problem we provide in one aspect of our invention a method of sealing wherein one or both of the end surfaces for sealing are coated with a sealing composition which is premelted to provide a surface with a smoothness akin to that of glass.

Furthermore it is known that when an arc tube operates in the vertical position the uppermost end runs hotter than the lower end with the temperature difference being of the order of 100° C. It is advantageous to develop sealing materials and components which are compatible with the operating temperatures used, since it would be uneconomic to use a high temperature sealing composition where a lower would suffice. According to a further aspect of this invention sealing compositions have been developed which do offer this choice of action; moreover, it has been found that the sealing composition developed for the higher temperature use provides a whitish opaque appearance in the finished sealed arc tube. Since seals made from other compositions appear glassy in appearance, it is possible visually to distinguish the end of the arc tube which will be used for the higher temperature end, and obviates the necessity of specifically marking or otherwise identifying similar looking seals.

It is an object of this invention to provide an improved arc tube utilising a sealing composition comprising alumina, silica and magnesia to provide a hermetic bond between an arc tube envelope and a cermet forming an end closure therefor. A further object is to provide methods of using these compositions in such constructions.

According to this invention we provide an arc tube for a discharge lamp said arc tube comprising an envelope of polycrystalline alumina, sapphire or a spinel and one or more end closures hermetically sealed thereto by a sealing composition wherein said sealing composition comprises silica, alumina and magnesia in certain proportions such that their linear expansion co-efficient is more closely adapted to the preferred tungsten/alumina cermets referred to above. Particularly preferred because they have a rather lower melting point, are those compositions which include between 15-28% by weight of MgO and of these, those also including 13-21% by weight of $Al_2O_3$ are preferred most of all since they have the lowest melting point.

According to a further aspect of the invention there is provided a method of producing an arc tube for a discharge lamp which includes the step of sealing a closure member to an arc tube of polycrystalline alumina, sapphire or a spinel wherein in said sealing step there is first applied to at least one of the surfaces to be sealed a layer of a sealing composition comprising silica, alumina and magnesia, said layer being heated to its melting point to form a relatively smooth surface and then pressure bonding said surface to a closure member.

Yet a further aspect of the invention comprises an arc tube arranged for vertical operation having a first end sealed by a first closure member and a second end sealed by a second closure member, wherein said first and second closure members are sealed to said arc tube by a sealing composition comprising silica, alumina and magnesia and wherein said first end operates at a temperature substantially greater than said second end, said arc tube being characterised in that said first end seal is visually distinguishable from said second seal by virtue of the sealing compositions comprising said silica, alumina and magnesia, and by virtue of the heat treatment applied thereto.

In addition to the above main constituents small additions of nucleating agents such as phosphorus pentoxide (up to 5% by weight), rare earth oxides, titania, zirconia or chromia can be included in the starting materials which are helpful in controlling the size and extent of the crystalline phase during the in-situ sealing operation. It has also been found that up to 5% by weight of boric oxide can be incorporated in the composition to improve the flow characteristics of the sealing compositions without any adverse effect on seal performance. Some amount up to 10% by weight selected from the group consisting of $HfO_2$ and rare earth oxides such as $Y_2O_3$, $Yb_2O_3$, $La_2O_3$, $Dy_2O_3$ and $Eu_2O_3$, can be included in the compositions to improve the thermal and mechanical properties of the joints.

Generally speaking the compositions of the invention may be obtained by taking the starting ingredients in the form of fine powders and tumbler mixing for about 1 hour. The appropriate amount of the major oxide components may be added in the form of a precursor soluble salt such as a nitrate, a sulphate or an oxalate. The minor constituents may likewise be added either in the form of the oxide or, preferably, as a soluble salt. The mixture is then heated at about 200° C. in a high purity alumina crucible for about 2 hours to homogenize the mixture, followed by calcination at a temperature of up to 1200° C. for about 7 hours in air or an inert atmosphere. The calcined oxides are then crushed and sieved through a 250 micro mesh. An alternative method to homogenize the components is to melt the mixture at about 1650° C. in air or in a controlled atmosphere in a crucible made from platinum containing 10% rhodium or in an iridium crucible for materials with melting points higher than 1650° C. This melt is then stirred for several hours and the resulting glass quenched in distilled water. The mixture is then dried and milled to form a fine glass powder, which may then be formed into suitable annular discs. Up to 2% by weight of a binder such a polyvinyl alcohol may be added which assists in the automatic pressing of the annular discs. This binder has to be removed prior to sealing by preheating or premelting.

The invention will now be described by way of example only and with reference to the accompanying drawings wherein.

Figure 1:
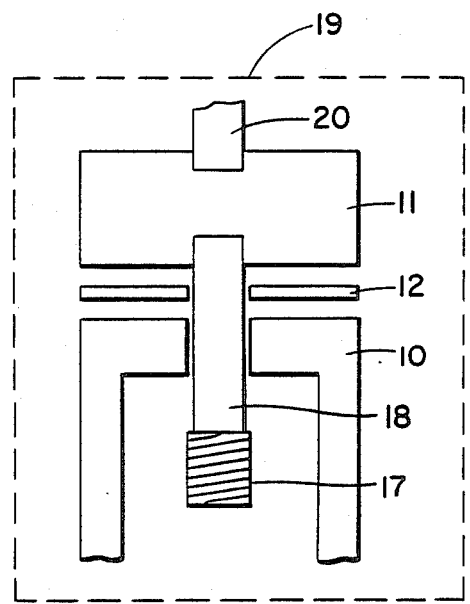
FIG. 1 illustrates the formation of an arc tube of the invention by one of the methods described herein.

The temperatures at which lamps according to the invention can be sealed, with and without a premelting stage, are also shown on the tables. There are listed in the following Tables 1 and 3, compositions which contain from about 25% to 28% by weight of MgO and from about 13% to 21% by weight of $Al_2O_3$.

TABLE 1

| SEALING COMPOSITIONS BY WT % | | | SEALING TEMPERATURE °C. | |
|---|---|---|---|---|
| | | | BY DIRECT | BY PREMELTING AND PRESSURE |
| No. | MgO | $Al_2O_3$ | $SiO_2$ | MELTING | BONDING |
| 1 | 28.00 | 20.00 | 52.00 | 1390 | 850–1000° C. |
| 2 | 26.25 | 13.12 | 60.67 | 1440 | " |
| 3 | 27.50 | 14.37 | 58.13 | 1475 | " |
| 4 | 24.85 | 18.13 | 57.02 | 1450 | " |

TABLE 2

| SEALING COMPOSITIONS BY WT % | | | SEALING TEMPERATURE °C. | |
|---|---|---|---|---|
| | | | BY DIRECT | BY PREMELTING AND PRESSURE |
| No. | MgO | $Al_2O_3$ | $SiO_2$ | MELTING | BONDING |
| 1 | 22.50 | 30.63 | 46.87 | 1525 | 900–1300 |
| 2 | 20.00 | 36.00 | 44.00 | 1550 | " |
| 3 | 19.38 | 34.37 | 46.25 | 1590 | " |
| 4 | 17.00 | 33.13 | 49.87 | 1675 | " |
| 5 | 15.20 | 42.00 | 42.80 | 1700 | 1200–1500 |
| 6 | 35.00 | 5.00 | 60.00 | 1750 | " |
| 7 | 37.00 | 4.00 | 59.00 | 1790 | " |

In Table 3 there are listed further specific examples of sealing compositions which incorporate additives such as $P_2O_5$ and/or $B_2O_3$.

TABLE 3

| SEALING COMPOSITIONS BY WT % | | | | | SEALING TEMPERATURE (°C.) | |
|---|---|---|---|---|---|---|
| No. | MgO | $Al_2O_3$ | $SiO_2$ | $B_2O_3$ | $P_2O_5$ | BY DIRECT MELTING | BY PREMELTING AND PRESSURE BONDING |
| 1 | 26.00 | 20.00 | 52.00 | 2.00 | — | 1400 | 850–1000° C. |
| 2 | 26.67 | 19.05 | 49.52 | 4.76 | — | 1420 | " |
| 3 | 26.00 | 19.00 | 51.00 | 2.00 | 2.00 | 1425 | " |
| 4 | 23.52 | 17.64 | 56.88 | 1.96 | — | 1400 | " |

The method whereby the compositions shown in Tables 1, 2 and 3 are produced are illustrated by the following specific details relating to Table 1 No. 1, Table 2 No. 5 and Table 3 No. 2.

EXAMPLE 1, (Table 1 No. 1)

20 grams of alumina, 28 grams of magnesia, 52 grams of silica were provided as fine powders and subjected to the following process:

(a) the ingredients were tumbler mixed for one hour,
(b) the resulting mixture was heated at 200° C. in a high purity alumina crucible
(c) the heated mixture was then calcined in a furnace by holding at 1200° C. for 7 hours in air,
(d) the calcined oxides were then crushed and sieved through a 250 mesh sieve,
(e) the sieved calcined oxides were then melted in a platinum-10% rhodium crucible at 1500° C. for 3 hours,
(f) the resulting melt is then poured into a stainless steel tray containing distilled water,
(g) the resulting glass frit was then dried and ground in an alumina ball mill for 7 hours,
(h) 100 grams of above glass ground was then mixed with 2% polyvinyl alcohol and pressed into annular discs,
(i) these discs are then prefired in air at 750° C. for 3 hours,
(j) the discs are then ready for use.

EXAMPLE 2 (Table 2 No. 5)

42 Grams of alumina, 15.2 grams of magnesia, 42.8 grams of silica were provided as fine powders and subjected to the following process:
  (a) the ingredients were tumbler mixed for one hour,
  (b) the resulting mixture was heated at 200° C. in a high purity alumina crucible,
  (c) the heated mixture was then calcined in a furnace by holding at 1200° C. for 7 hours in air,
  (d) the calcined oxides were then crushed and sieved through a 250 mesh sieve,
  (e) the sieved calcined oxides were then melted in a platinum-10% rhodium crucible at 1500° C. for 3 hours,
  (f) the resulting melt is then poured into a stainless steel tray containing distilled water,
  (g) the resulting glass frit was then dried and ground in an alumina ball mill for 7 hours,
  (h) 100 grams of above glass ground was then mixed with 2% polyvinyl alchohol and pressed into annular discs,
  (i) these discs are then prefired in air at 750° C. for 3 hours,
  (j) the discs are then ready for use.

EXAMPLE 3 (Table 3, No. 2)

19.05 Grams of alumina, 26.67 grams of magnesia, 49.52 grams of silica and 4.76 grams of boric oxide were provided as fine powders and subjected to the following process:
  (a) the ingredients were tumbler mixed for one hour,
  (b) the resulting mixture was heated at 200° C. in a high purity alumina crucible,
  (c) the heated mixture was then calcined in a furnace by holding at 1200° C. for 7 hours in air,
  (d) the calcined oxides were then crushed and sieved through a 250 mesh sieve,
  (e) the sieved calcined oxides were then melted in a platinum-10% rhodium crucible at 1500° C. for 3 hours,
  (f) the resulting melt is then poured into a stainless steel tray containing distilled water,
  (g) the resulting glass frit was then dried and ground in an alumina ball mill for 7 hours,
  (h) 100 grams of above glass ground was then mixed with 2% polyvinyl alchohol and pressed into annular discs,
  (i) these discs are then prefired in air at 750° C. for 3 hours,
  (j) the discs are then ready for use.

An example of the use of a composition according to the present invention as used in the construction of a tin sodium halide lamp is as follows:

In FIG. 1 there is shown a cermet end closure member 11 carrying conducting members 20 and 18, the latter supporting the lamp electrode 17 and one end of a polycrystalline alumina arc tube envelope 10. An annular disc 12 of sealing composition selected from Table 1, for example, Example 1 (Table 1, No. 1) having 28.00% by weight of MgO; 20.00% by weight $Al_2O_3$ and 52% by weight of $SiO_2$ is positioned around the member 18 and between the envelope and the end closure member 11.

This assembly is heated to about 1450° C. in a chamber capable of evacuation, diagramatically indicated by 19 until the composition softens and then pressure ranging between 0.05 to 1 MN per square meter is applied to make the joint between parts 10 and 11. The total time taken to make seals in lamps according to the above method is about 4 minutes. In a modification of this method, instead of using a preformed annular disc a powder (ground glass or intimately calcined oxide) may be used.

Instead of the glassy seal produced by the above methods, a highly crystalline ceramic seal of a more refractory nature can be produced by additional heat treatment for several hours at a temperature of from 900°–1000° C.: typically an initial heat treatment whilst holding the parts under pressure at 700° C. for 30 minutes is followed by further heating, still under pressure, at 950° C. for an hour or more.

Figure 2:
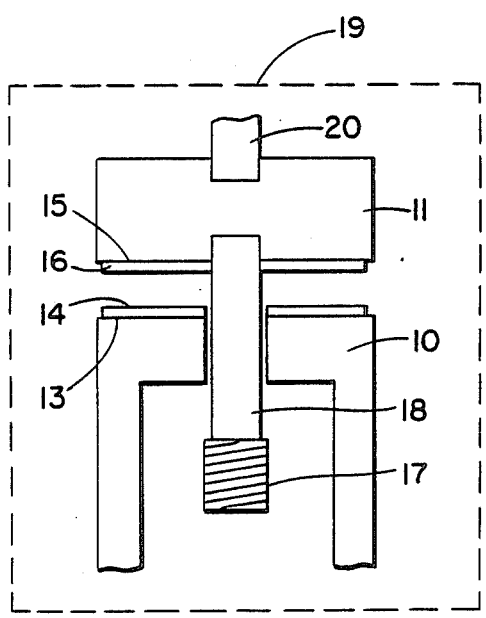
FIG. 2 illustrates the formation of an arc tube of the invention by another of the methods described herein.

A further example of the use of a composition in the manufacture of a tin sodium halide lamp according to the present invention is shown in FIG. 2. In FIG. 2 there is shown an end of a polycrystalline alumina tube 10. Such arc tube can be cut to length by sawing with a diamond wheel and the resulting end surface 13 is extremely rough which adds to the difficulties of making hermetic seals. This problem can be alleviated as follows. A layer 14 of sealing composition according to the present invention in this case, Example 3, (Table 3, No. 2) comprising 26.67% by weight of MgO; 19.05% by weight of $Al_2O_3$; 49.52% by weight of $SiO_2$ and 4.76% by weight of $B_2O_3$ is premelted and applied to the end surface 13 of the arc tube. By premelting a layer 14 of the sealing composition onto the cut surface 13 of the top of the arc tube a very much smoother surface can be obtained. Thereafter the joint can be made with the cermet end closure member 11 as previously described by heating until the premelted composition softens and applying pressure, between 0.05 to 1 MN per square meter. An extension of this method which can be applied to both embodiments is to apply a premelted layer 16 to the surface 15 of the cermet to be joined. Thereafter the assembly is heated to the softening temperature of the chosen composition. A further advantage attributable to the last mentioned method is that a particular combination of sealing composition may be selected to be more compatible with the respective sealing member. For example, layer 16 of FIG. 2 can have a composition more compatible with the cermet 11 while the layer 14 can have a composition more compatible with the material of the arc tube 10.

When using a composition selected from Table 2 the temperatures used are higher, as indicated in the right hand column of that table, and this results in a highly refractory seal which is visually easily distinguished since it is of a white colour. This is particularly useful, as hereinbefore described for distinguishing this seal, e.g. in a case where it is required to have one end of an arc tube operating at a higher temperature than the other as found, for example, in an arc tube operating in the vertical position.

In the above description it will be appreciated that there will be some variation in the heating, cooling and pressing steps depending on the actual ingredients of the sealing composition used.

What I claim is:

1. An arc tube for a metal halide discharge lamp, said arc tube comprising an envelope of polycrystalline alumina, sapphire or a spinel, and one or more cermet end closures hermetically sealed thereto by a sealing composition, said sealing composition consisting of at least one of:

(I) about 2.00% to about 5% by weight of at least one nucleating agent selected from the group consisting of phosphorus pentoxide, titania, zirconia and chromia;

(II) about 1.96% to about 5% by weight of boric oxide;

(III) up to about 10% by weight of a nucleating agent selected from the group consisting of $HfO_2$, $Y_2O_3$, $Yb_2O_3$, $La_2O_3$, $Dy_2O_3$, and $Eu_2O_3$; and the remaining part of said sealing composition consisting of a mixture of from about 13% to about 21% by weight of the mixture of alumina;

from about 25% to about 28% by weight of the mixture of magnesia; and the balance based on 100% of the mixture being silica.

2. The arc tube of claim 1 wherein the sealing composition contains between about 2.00% and about 5% by weight of phosphorous pentoxide.

3. The arc tube of claim 1 wherein said sealing composition consists of:

about 26.67% by weight of MgO;
about 19.05% by weight of $Al_2O_3$;
about 49.52% by weight of $SiO_2$; and
about 4.76% by weight of $B_2O_3$, all with respect to 100% of the mixture.

4. An arc tube for a metal halide discharge lamp comprising an envelope of polycrystalline alumina, sapphire, or a spinel, and one or more cermet end closures hermetically sealed thereto by a sealing composition, said sealing composition consisting of:

up to about 10% by weight of the composition of a nucleating agent selected from the group consisting of $HfO_2$, $Y_2O_3$, $Yb_2O_3$, $Dy_2O_3$ and $Eu_2O_3$; and the remaining part of said sealing composition consisting of a mixture of silica, alumina and magnesia, there being:

between about 13% and about 21% by weight of alumina;

between about 25% and about 28% by weight of magnesia; and the balance being silica.

* * * * *